United States Patent
Tabata (10) Patent No.: US 6,716,507 B2
(45) Date of Patent: Apr. 6, 2004

(54) OPTICAL RECORDING MEDIUM

(75) Inventor: Hiroshi Tabata, Mito (JP)

(73) Assignee: Victor Company of Japan (JP)

( * ) Notice: Subject to any disclaimer, the term of this patent is extended or adjusted under 35 U.S.C. 154(b) by 40 days.

(21) Appl. No.: 09/996,995

(22) Filed: Nov. 30, 2001

(65) Prior Publication Data

US 2002/0098315 A1 Jul. 25, 2002

(30) Foreign Application Priority Data

Nov. 30, 2000 (JP) ........................................ 2000-364441

(51) Int. Cl.⁷ ................................................. B32B 3/02
(52) U.S. Cl. .................... 428/64.1; 428/64.4; 428/64.5; 428/64.6; 430/270.13
(58) Field of Search ............................. 428/64.1, 64.4, 428/64.5, 64.6, 913; 430/270.13, 495.1, 945; 369/275.5

(56) References Cited

U.S. PATENT DOCUMENTS

| | | | | |
|---|---|---|---|---|
| 6,159,573 A | * | 12/2000 | Zhou | 428/64.1 |
| 6,268,034 B1 | * | 7/2001 | Kitaura | 428/64.1 |
| 6,416,837 B1 | * | 7/2002 | Kojima | 428/64.1 |
| 6,432,502 B1 | * | 8/2002 | Kitaura | 428/64.1 |

FOREIGN PATENT DOCUMENTS

| | | |
|---|---|---|
| JP | 61-272190 | 12/1986 |
| JP | 11-66611 | 3/1999 |
| JP | 2000-182277 | 6/2000 |

\* cited by examiner

*Primary Examiner*—Elizabeth Mulvaney
(74) *Attorney, Agent, or Firm*—Connolly Bove Lodge & Hutz LLP (57) ABSTRACT

An optical recording medium 10 comprises a substrate 1, first protective layer 2, interfacial layer 3, recording layer 4, second protective layer 5, light absorbing and heat generating layer 6, third protective layer 7, reflection layer 8 and a protective film 9 laminated in order. The light absorbing and heat generating layer 6 is a metal layer or an alloy layer containing more than one element out of Ge, Sn, Pb, Cr, Ti, In, Si, Cd, Se, W, Mo, Zr, Nb, Zn and Hf, so that a reflectivity of the optical recording medium 10 and an optical modulation factor, which is an optical modulation factor in a phase changing state of crystalline or amorphous, in the recording layer 4 can be always maintained in high. Accordingly, a recording sensitivity of the recording layer 4 in the optical recording medium 10 can be increased without deteriorating a characteristic such as reflectivity and jitter.

1 Claim, 1 Drawing Sheet

Fig. 1

OPTICAL RECORDING MEDIUM

BACKGROUND OF THE INVENTION

1. Field of the Invention

The present invention relates to an optical recording medium, which is recorded, erased and reproduced by irradiating a light beam, particularly, relates to a rewritable phase change type optical recording medium such as an optical disc and an optical card, which exhibits higher sensitivity even at higher linear velocity and enables an excellent recording to realize.

2. Description of the Related Art

The conventional arts related to a rewritable phase change type optical recording medium are as follows: such a rewritable phase change type optical recording medium is formed with an amorphous record mark through the processes of melting a recording layer by impressing a laser beam pulse on the recording layer while recording and rapidly cooling down the melted recording layer. A reflectivity of the record mark is lower than that of the recording layer in crystalloid and the record mark is optically read out as a recorded information. When erasing the record mark, the record mark in amorphous is transformed into crystalloid by adjusting temperature of the recording layer within the range of more than crystallizing temperature and below the melting point by irradiating a laser beam in a lower power than that for recording.

With respect to a material enabling such the recording method, alloys such as Ge—Sb—Te alloy and Ag—In—Sb—Te alloy are preferably utilized due to a relatively higher crystallizing speed. In an optical recording medium having a recording layer formed by using such the recording material as the alloy mentioned above, a dielectric layer having heat-resistivity and transparency is generally formed on both sides of the recording layer in order to prevent the recording layer from deforming and opening.

Further, if the dielectric layer is formed by a material containing ZnS component, there existed an optical recording medium having an interfacial layer such as nitride inserted between the recording layer and the dielectric layer on one side or both sides of the recording layer in order to prevent the recording layer from the S (sulfur) penetrating. Furthermore, an art such as laminating a metallic reflection layer consisting Al or Ag as a major component on the surface of the dielectric layer opposite to the incident direction of laser beam is well known with respect to enabling higher reflectivity.

Problems arisen along with the above-mentioned phase change type optical recording medium are as follows: in the conventional disc structure, only a protective layer being composed of a dielectric layer is provided between a recording layer and a reflection layer. The protective layer fulfils only a function of preserving or transmitting heat generated while recording, so that the heat is hard to be controlled. In other words, by thickening the protective layer provided between the recording layer and the reflection layer, the heat tends to be preserved. Consequently, a melting area of the recording layer enlarges and a record mark in amorphous becomes wider, and then a modulation factor can be increased. However, on the contrary, the heat spreads through a crystalline area and forms microscopic amorphous therein when the melting area enlarged. Accordingly, a reflectivity is deteriorated. On the other hand, by thinning the protective layer provided between the recording layer and the reflection layer, a reflectivity increases. However, a modulation factor is deteriorated.

As mentioned above, it is hard to improve both the modulation factor and reflectivity simultaneously by only one layer of the protective layer provided between the recording layer and the reflection layer, wherein a number of layers becomes two if an interfacial layer being adjacent to the recording layer and provided on the side facing toward the reflection layer is counted. Further, if the protective layer is thin, the modulation factor becomes higher by increasing a laser beam power. However, a lower laser beam power is desirable in consideration of lifetime of a laser device in hardware. Furthermore, in a case of recording by higher linear velocity, a higher laser beam power is required for recording according to the principle of phase change. In some cases, the required laser beam power may exceed the upper limit of a recording and reproducing apparatus for personal use.

Maintaining a certain reflectivity and simultaneously obtaining a higher modulation factor while lowering a laser beam power has been the subject of the prior art. As a method for obtaining a higher modulation factor, that is, as a method for increasing a recording sensitivity, there existed the prior art. The Japanese Patent Laid-open Publication No. 61-272190/1986 discloses that a thin film of Ge, Cr, Ti and Ni, which has a higher absorption index for the wavelength range of a semiconductor laser beam, is inserted. However, the thin film is directly contacted with a recording layer, so that the thin film is molten with the recording layer and the molten thin film and recording layer compose a different component from the original ones. Consequently, a characteristic of recording is deteriorated. Actually, a jitter and a reflectivity was extremely deteriorated according to the feasibility study by producing a sample of Ag—In—Sb—Te alloy as a recording layer component.

The other Japanese Patent Laid-open Publications, mentioned below, disclose that reducing a difference of light absorption between an amorphous section and a crystalloid section by inserting a layer having a function of absorbing light and consequently improving the recording sensitivity in the crystalloid section can improve a jitter characteristic although a total recording sensitivity is not aimed to be improved.

According to the Japanese Patent Laid-open Publication No. 11-66611/1999, the optical recording medium is composed of a first dielectric layer, a recording layer, a second dielectric layer, a reflection layer, a third dielectric layer and a protective film. They are laminated on a substrate in order as a layering structure. However, since the reflection layer is laminated by an element consisting Si or Ge having a function of absorbing light as a major component in some tens nm thick, a sufficiently high reflectivity can not be obtained in comparison with the reflection layer composed of an alloy containing Al or Ag.

According to the Japanese Patent Laid-open Publication 2000-182277/2000, the optical recording medium is composed of a first dielectric layer, a recording layer, an absorbing amount compensating layer having a light absorbing functional layer and a reflection layer. They are laminated on a substrate in order as a layering structure. However, since the absorbing amount compensating layer is directly contacted with the reflection layer, heat generated in the absorbing amount compensating layer flows through the reflection layer and fails to be transmitted to the recording layer although a light absorbing amount can be controlled. Accordingly, the optical recording medium failed to be a recording medium in high sensitivity because the heat was not transmitted to the recording layer.

SUMMARY OF THE INVENTION

Accordingly, in consideration of the above-mentioned problems of the prior arts, an object of the present invention is to provide an optical recording medium, which can improve a recording sensitivity in a recording layer without deteriorating characteristics such as a reflectivity and a jitter since a reflectivity in a reflection layer and a light modulation-factor in a phase change state between crystalline and amorphous in a recording layer is always maintained high. Further, the optical recording medium can obtain a higher light modulation factor even though a laser beam in a lower power is irradiated. Furthermore, the optical recording medium can maintain a higher recording characteristic for a recording by a higher linear velocity.

In order to achieve the above object, the present invention provides, according to an aspect thereof, an optical recording medium comprising a substrate, a first protective layer, a recording layer, a second protective layer, a light absorbing and heat generating layer, a third protective layer and a reflection layer laminated in order, wherein the light absorbing and heat generating layer is one of a metal layer and an alloy layer containing more than one element out of Ge, Sn, Pb, Cr, Ti, In, Si, Cd, Se, W, Mo, Zr, Nb, Zn and Hf.

According to another aspect of the present invention, there provided an optical recording medium comprising a substrate, a first protective layer, a recording layer, a second protective layer, a light absorbing and heat generating layer, a third protective layer and a reflection layer laminated in order, with defining that: a second heat conductive distance between the light absorbing and heat generating layer and the recording layer is d2, wherein heat is transmitted from the light absorbing and heat generating layer to the recording layer through the second protective layer; and a third heat conductive distance between the light absorbing and heat generating layer and the reflection layer is d3, wherein heat is transmitted from the light absorbing and heat generating layer to the reflection layer through the third protective layer, the optical recording medium is further characterized in that a relation between d2 and d3 is $d2 \leq d3 < 30 \times 10^{-9}$ [m], wherein the second heat conductive distance d2 and the third heat conductive distance d3 are $d2=(t2/\sigma 2)$ [m] and $d3=(t3/\sigma 3)$ [m] respectively, where t2 is a thickness of the second protective layer, t3 is a thickness of the third protective layer, $\sigma 2$ is a heat conductivity of the second protective layer, $\sigma 3$ is a heat conductivity of the third protective layer, and wherein $\sigma 2$ and $\sigma 3$ are expressed in a value relative to a heat conductivity $\sigma 1$ of $ZnS_{(80)}$—$SiO_{2\ (20)}$ being 1.0.

Other object and further features of the present invention will be apparent from the following detailed description when read in conjunction with the accompanying drawing.

DETAILED DESCRIPTION OF THE PREFERRED EMBODIMENTS

Figure 1:
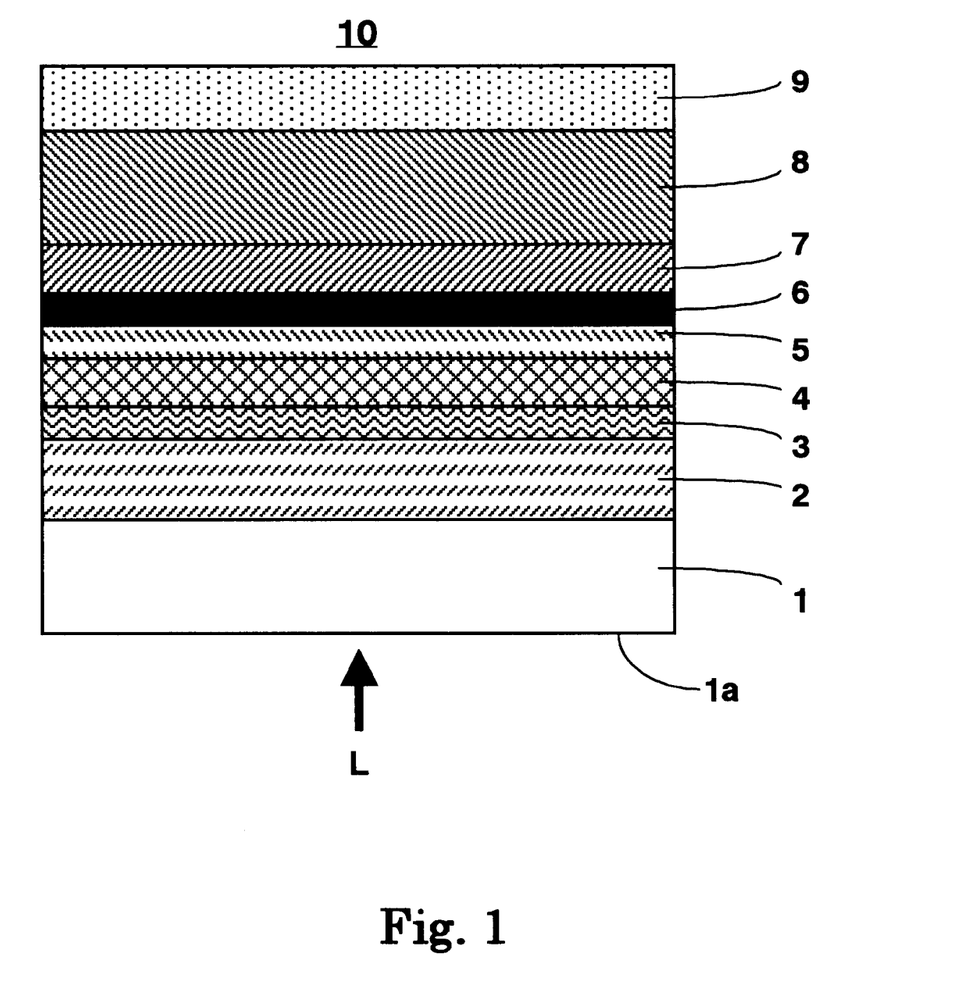
FIG. 1 is a cross sectional view of a phase change type optical recording medium showing a structure of laminated layers according to an embodiment of the present invention.

FIG. 1 is a cross sectional view of a phase change type optical recording medium partially enlarged according to an embodiment of the present invention.

In FIG. 1, an optical recording medium 10 is composed of a substrate 1, a first protective layer 2, an interfacial layer 3, a recording layer 4, a second protective layer 5, a light absorbing and heat generating layer 6, a third protective layer 7, a reflection layer 8 and a protective film 9. They are laminated in order as a fundamental structure. Further, another interfacial layer can be inserted between the recording layer 4 and the second protective layer 5 as same manner as the interfacial layer 3. Furthermore, a laser beam for recording or reproducing is irradiated on a surface 1a of the substrate 1 in a direction shown by an arrow "L".

With respect to a material for the substrate 1 of the optical recording medium 10, various kinds of transparent resins and a transparent glass can be used. In order to prevent the optical recording medium 10 from affection by dust and scratch on the substrate 1, a transparent material is used for the substrate 1. The optical recording medium 10 is preferable to be recorded by a condensed laser beam through the substrate 1. A transparent material for such the substrate 1 is listed as follows: glass, polycarbonate, polymethyle methacrylate, polyolefin resin, epoxy resin and polyimide resin. Particularly, polycarbonate resin is desirable since it is excellent in optical birefringence, low in hygroscopicity and easy to form.

A thickness of the substrate 1 is not defined to a specific dimension. However, it is desirable to be 0.6 mm thick in consideration of interchangeability with a digital versatile disc (DVD). Practically, it shall be within a range of 0.01 to 5 mm. If the thickness of the substrate 1 is less than 0.01 mm, recording by a laser beam focused from the outer surface of the substrate 1 is easily affected by dust on the surface 1a of the substrate 1. If the thickness of the substrate 1 exceeds 5 mm, it is hard to increase a numerical aperture of an objective lens and a spot size of laser beam irradiated becomes larger. Consequently, it is hard to increase a packing density.

The substrate 1 can be either flexible or rigid. A flexible substrate 1 is used in a shape of tape, sheet or card. A rigid substrate 1 is used in a shape of card or disc.

Further, after the substrate 1 is laminated by several layers such as the recording layer 4, three protective layers 2, 5 and 7, the reflection layer 8, the interfacial layer 3 and the light absorbing and heat generating layer 6, two sheets of such the substrate 1 are conformed back to back with each other, then they can be formed in a structure such as a air sandwich structure, an air incident structure or an adhesion structure. Furthermore, the first, second and third protective layers 2, 5 and 7 prevent a recording characteristic from being deteriorated due to deformation of the substrate 1 and the recording layer 4 caused by heat while recording. Consequently, by an effect of preventing the substrate 1 and the recording layer 4 from heat and optical coherence effect, the first, second and third protective layers 2, 5 and 7 are effective for improving a signal contrast while reproducing.

The first, second and third protective layers 2, 5 and 7 are transparent with respect to a laser beam for recording and reproducing and their refractive index "n" is within a range of $1.9 \leq n \leq 2.3$. The first protective layer 2, the second protective layer 5 and the third protective layer 7 is not limited to an identical material or composition even they can be composed of different materials. Particularly, a mixture film of ZnS and $SiO_2$ is preferable because a recording sensitivity, a carrier to noise ratio (C/N) and an erasing ratio is hard to be deteriorated even though recording and erasing is repeated. A material of these protective layers can be a same as that of the interfacial layer 3, which will be explained.

A thickness of the first protective layer 2 is approximately within a range of 5 to 500 nm. It is difficult for the first protective layer 2 to be peeled off from the substrate 1 or the recording layer 4 and it is resistant to a defect such as crack, so that the thickness is more preferable within a range of 40 to 300 nm.

A thickness of the second protective layer 5 is preferable to be within a range of 0.5 to 50 nm in order to transmit heat generated in the light absorbing and heat generating layer 6 to the recording layer 4 effectively in conjunction with preventing the recording layer 4 from penetrating a compositional element of the light absorbing and heat generating layer 6.

A thickness of the third protective layer 7 is preferable to be within a range of 0.5 to 50 nm in order to maintain recording characteristics such as a C/N and an erasing ratio excellent and to enable to rewrite plural times stably. A total thickness of the second and third protective layers 5 and 7 is preferable to be within a range of 5 to 50 nm. If the total thickness is thinner than the range, a distance between the recording layer 4 and the reflection layer 8 becomes narrower and a quick cooling structure is formed. Consequently, a larger recording power of laser beam is necessary to form a record mark. On the contrary, if the total thickness of the second and third protective layers 5 and 7 is thicker than the range, a distance between the recording layer 4 and the reflection layer 8 becomes wider and a gradually cooling structure is formed. Consequently, a reflectivity of the optical recording medium 10 is deteriorated and further a repetitive number of overwriting decreases.

It is desirable for the recording layer 4 to contain Sb and Te, that is, following alloys are desirable: Ge—Sb—Te alloy, In—Sb—Te alloy, Pd—Ge—Sb—Te alloy, Pt—Ge—Sb—Te alloy, Nb—Ge—Sb—Te alloy, Ni—Ge—Sb—Te alloy, Co—Ge—Sb—Te alloy, Ag—In—Sb—Te alloy, Ag—V—In—Sb—Te alloy, Ag—Ge—Sb—Te alloy, Ag—Pd—Ge—Sb—Te alloy and Pd—Nb—Ge—Sb—Te alloy. Particularly, Ge—Sb—Te and Ag—In—Sb—Te alloys are short in an erasing time and can be recorded and erased repeatedly a plurality of times, and further they are excellent in recording characteristics such as a C/N and an erasing ratio.

With respect to a material of the interfacial layer 3 being in contact with one side or both sides of the recording layer 4, excluding sulfur is most important for the material. If a material including sulfur is used for the interfacial layer 3, sulfide contained in the interfacial layer 3 diffuses into the recording layer 4 by repetitive overwrite, and recording characteristics may be deteriorated. Consequently, such a material containing sulfide is not desirable for the interfacial layer 3. Further, such the material is not desirable for the interfacial layer 3 from a point of view of that an erasing characteristic is deteriorated. A material containing at least one of nitride, oxide and carbide is desirable. Actually, a material containing at least one of germanium nitride, silicon nitride, aluminum nitride, aluminum oxide, zirconium oxide, chromium oxide, silicon carbide and carbon is desirable. Further, an element such as oxygen, nitrogen and hydrogen can be contained in those materials mentioned above. The above-mentioned nitride, oxide and carbide are not necessary to be a stoichiometry composition and further they can be acceptable to be in excess of or in want of nitrogen, oxygen or carbon. Accordingly, the interfacial layer 3 is hard to be peeled off and, in some cases, a film characteristic such as storage endurance can be improved as a result.

A material for the reflection layer 8 is listed as follows: a metal having an optical reflectiveness such as Al, Au or Ag, an alloy containing these metals as a major component and an added element composed of more than one kind of other metals or semiconductors, and a mixture of a metal such as Al, Au or Ag mixed with metal compounds such as metal nitride, metal oxide and metal chalcogenide of Al or Si.

A metal such as Al, Au or Ag and an alloy containing these metals as a major component is high in optical reflectiveness and its heat conductivity can be increased, so that these materials are desirable for the reflection layer 8. As an example of the above-mentioned alloy, there existed an alloy of Al added with at least one element out of Si, Mg, Cu, Pd, Ti, Cr, Hf, Ta, Nb, Mn and Zr by less than 5 atomic percents and more than one atomic percent in total and another alloy of Au or Ag added with at least one element out of Cr, Ag, Cu, Pd, Pt and Ni by less than 20 atomic percents and more than one atomic percent in total. Particularly, the reflection layer 8 is desirable to be constituted by an alloy containing an added element by more than 0.5 atomic percent and less than 3 atomic percents in total such as an alloy containing Al as a major component out of Al—Cr alloy, Al—Ti alloy, Al—Ta alloy, Al—Zr alloy, Al—Ti—Cr alloy and Al—Si—Mn alloy or another alloy containing Ag as a major component out of Ag—Pd alloy, Ag—Ta alloy, Ag—Ti alloy, Ag—Cr alloy and Ag—Pd—Cu alloy. Particularly, an Ag alloy is desirable for higher packing density because its reflectivity against a blue laser beam can be increased.

A thickness of the reflection layer 8 is desirable to be within a range of 50 to 300 nm. A film thickness of the reflection layer 8 varies by a thermal conductivity of a metal or an alloy forming the reflection layer 8. In a case of an Al—Cr alloy, for example, a thermal conductivity decreases in accordance with increasing of a content amount of Cr. Therefore, an optical recording medium containing the Al—Cr ally as the reflection layer 8 can not comply with a recording strategy any more, otherwise the film thickness of the reflection layer 8 is thickened. If the content amount of Cr is high, the recording layer 4 is easily heated and hard to be cooled down, thus a gradually cooling structure, so called, is formed. In order to control forming of a record mark by the recording strategy, it is necessary to shorten a head pulse, to shorten multi-pulses or to extend a cooling pulse.

If the thickness of the reflection layer 8 exceeds 50 nm, the reflectivity of the reflection layer 8 does not change optically. However, a cooling speed is extremely affected by the thickness although a value of reflectivity is not affected by the thickness. Forming a thickness of more than 300 nm takes a longer period of time in a manufacturing process, so that the thickness of the reflection layer 8 is controlled to be within an appropriate range by using a material having a higher thermal conductivity for the reflection layer 8.

A material for the light absorbing and heat generating layer 6, which is a major feature of the present invention, is as follows: a metal layer or an alloy layer containing more than one component out of Ge, Sn, Pb, Cr, Ti, In, Si, Cd, Se, W, Mo, Zr, Nb, Zn and Hf. Particularly, Ge, Cr and Si are preferable for a material of the light absorbing and heat generating layer 6 because they have an advantage of excellent efficiency such that a target material of the light absorbing and heat generating layer 6 can be made common to that of the interfacial layer 3. These materials for the light absorbing and heat generating layer 6 are high in absorption index against a wavelength range from 830 nm of infrared region to 300 nm of ultraviolet region. Particularly, in a wavelength $\lambda$ of light utilized for recording, erasing and reproducing an information, it is desirable that a refractive index is within a range of more than 2.0 and less than 5.5, and an extinction coefficient is within a range of more than 1.0 and less than 4.0.

The light absorbing and heat generating layer 6 generates heat by absorbing a laser beam, which penetrates through the recording layer 4 while recording, and can supply the heat to the recording layer 4. Therefore, a power of laser beam for recording can be reduced. In other words, a power contrast between recording and erasing can be increased by doubling a layer, which absorbs a laser beam and generates heat, with the recording layer 4 and the light absorbing and heat generating layer 6.

The material of the second and third protective layers 5 and 7 is not limited to $ZnS_{(80)}$—$SiO_{2\ (20)}$. Any other materials having heat conductivity as low as possible are desirable for the second and third protective layers 5 and 7. If a material having higher heat conductivity is used for a protective layer, heat generated in the light absorbing and heat generating layer 6 easily drifts on the surface of the protective layer and a length of amorphous mark to be drawn is possibly led to error. Therefore, a jitter is deteriorated. Further, the heat is transmitted to a crystalline section of the recording layer 4 and the crystalline section reaches a high temperature and a microscopic amorphous is formed in the crystalline section. Accordingly, reflectivity of the optical recording medium 10 is deteriorated.

With defining that a second heat conductive distance between the light absorbing and heat generating layer 6 and the recording layer 4 is "d2", wherein heat is transmitted from the light absorbing and heat generating layer 6 to the recording layer 4 through the second protective layer 5, and that a third heat conductive distance between the light absorbing and heat generating layer 6 and the reflection layer 8 through the third protective layer 7 is "d3", wherein heat is transmitted from the light absorbing and heat generating layer 6 to the reflection layer 8 through the third protective layer 7, a relation between "d2" and "d3" is $d2 \leq d3 < 30 \times 10^{-9}$ [m], wherein the second heat conductive distance d2 and the third heat conductive distance d3 are $d2=(t2/\sigma2)$ [m] and $d3=(t3/\sigma3)$ [m] respectively, where "t2" is a thickness of the second protective layer 5, "t3" is a thickness of the third protective layer 7, "σ2" is a heat conductivity of the second protective layer 5, "σ3" is a heat conductivity of the third protective layer 7, wherein "σ2" and "σ3" are expressed in a relative value respectively with defining that a heat conductivity σ1 of $ZnS_{(80)}$—$SiO_{2\ (20)}$ is 1.0.

The heat conductivity such as "σ2" and "σ3" in the present invention is not an absolute value of heat conductivity in general, but a relative value on the basis of the heat conductivity σ1 of $ZnS_{(80)}$—$SiO_{2\ (20)}$ being generally utilized for a material of protective layer with defining that "σ1" is 1.0, wherein $ZnS_{(80)}$—$SiO_{2\ (20)}$ exhibits that a composition ratio of ZnS to $SiO_2$ is 80:20. A heat conductivity of thin film having a thickness of some tens nm can be hardly measured at the current technical level. Consequently, such a heat conductivity is expressed in a relative value as an original parameter in the present invention.

Further, the heat conductive distance such as "d2" and "d3" is a value of dividing a thickness of a protective layer or material by the above mentioned heat conductivity and an original parameter of the present invention. In the present invention, a relation between a thickness of material, that is, a distance of material and the heat conductivity mentioned above is considered as a way of thinking on heat conduction. Recording mediums having a same heat conductive distance can obtain a same modulation factor if they are recorded by a same recording power. Being modulation factors of the recording mediums identical with each other is that heat quantity flowing through the second protective layer 5 or the third protective layer 7 from the recording layer 4 are identical with each other in the recording mediums.

The second heat conductive distance d2 is 0<d2 because there existed the second protective layer 5. In a case that a relationship between the second and third heat conductive distances d2 and d3 is not equal to $d2 \leq d3$ but equal to d2>d3, that is, $(t2/\sigma2)>(t3/\sigma3)$, heat generated in the light absorbing and heat generating layer 6 is apt to drift to the reflection layer 8 rather than the recording layer 4 and hard to be supplied to the recording layer 4 effectively. Consequently, a modulation factor is reduced to, for example, 59.5% and 55.0% as exhibited by a comparative example 4 in Tables 7 and 8 (will be explained later). On the other hand, embodiments 1 and 11 through 14, which satisfy the relationship $d2 \leq d3$, shown in Tables 7 and 8 exhibit a modulation factor such as 61.5 to 63.2% and 57.5 to 59.1%.

Further, in a case that the third heat conductive distance d3 does not satisfy the inequality $d3<30\times10^{-9}$ [m] but satisfies $d3 \geq 30\times10^{-9}$ [m], a heat conductive distance between the recording layer 4 and the reflection layer 8 becomes wider and a modulation factor increases up to 74.3% and 68.8% as exhibited by a comparative example 5 in Tables 7 and 8. On the contrary, a reflectivity is extremely deteriorated such as 13.2% and 13.1%. On the other hand, the embodiments 1 and 11 through 14, which satisfy the inequality $d3<30\times10^{-9}$ [m], shown in Tables 7 and 8 exhibit that a modulation factor is 61.5 to 63.2% and 57.5 to 59.1% and a reflectivity is 17.8 to 18.1% and 17.8 to 18.0%.

Furthermore, the same effect mentioned above can be obtained by inserting a plurality of light absorbing and heat generating layers 6 into a protective layer between the recording layer 4 and the reflection layer 8 like a sandwich. However, a reflectivity is deteriorated, so that it is desirable to adjust a thickness and a number of the light absorbing and heat generating layer 6 in accordance with a required recording characteristic.

A film thickness of the light absorbing and heat generating layer 6 is desirable to be more than 0.5 nm in view of uniformity of the surface of the light absorbing and heat generating layer 6 and to be less than 20 nm in order to suppress deterioration of reflectivity. Further, the film thickness is more desirable to be within a range of more than 0.5 nm and less than 10 nm although the film thickness, which can obtain optimum light absorbing and heat generating effect and a higher reproduction signal strength, varies by an optical constant of the light absorbing and heat generating layer 6.

With respect to a light source utilized for recording on an optical recording medium of the present invention, a high intensity light source such as a laser beam and a stroboscopic beam is desirable. Particularly, a semiconductor laser beam is more desirable because its light source can be miniaturized and is low in power consumption and is easy to be modulated. Recording is performed by irradiating a laser beam pulse on the recording layer 4 in a crystalline state and forming an amorphous record mark.

On the contrary, a crystalline record mark can be formed on the recording layer 4 in an amorphous state. Erasing can be performed by irradiating a laser beam on an amorphous record mark so as to crystallize the record mark or by irradiating a laser beam on a crystalline record mark so as to change the crystalline record mark into amorphous. Forming an amorphous record mark when recording and crystallizing the amorphous record mark when erasing is a desirable method because an amorphous record mark can be formed rapidly and the recording layer 4 is hard to be deformed.

A method of one beam overwriting, which can rewrite by irradiating a laser beam once in such a manner as increasing a light intensity while forming a record mark and reducing slightly the light intensity while erasing, is desirable because a necessary time period for rewriting can be shortened.

A manufacturing method of the optical recording medium according to the present invention is depicted next.

With respect to a method of laminating the first through third protective layers 2, 5 and 7, the recording layer 4, the interfacial layer 3, the light absorbing and heat generating layer 6 and the reflection layer 8 on the substrate 1 in order, the well known thin film forming method in a vacuum is listed as follows: the vacuum evaporation method such as resister heating type and electron beam type, the ion plating method and the sputtering method such as DC or AC sputtering and reactive sputtering. Particularly, the sputtering method is desirable because a composition and a film thickness are easy to be controlled.

Further, a batch method, which can form a film on a plurality of substrates 1 simultaneously in a vacuum chamber, or a method of using a single disc sputtering system, which processes the substrate 1 one by one, is desirable. Controlling a layer thickness of the first through third protective layers 2, 5 and 7, the recording layer 4, the interfacial layer 3, the light absorbing and heat generating layer 6 and the reflection layer 8 being formed can easily be performed by controlling an input power of power supply of a sputtering device and a time duration of inputting the power or by monitoring a deposition condition by using a crystal vibration type film thickness gage.

Forming the first through third protection layers 2, 5 and 7, the recording layer 4, the interfacial layer 3, the light absorbing and heat generating layer 6 and the reflection layer 8 is performed by either keeping the substrate 1 fixed or moving and rotating the substrate 1. Rotating the substrate 1 is excellent in uniformity of film thickness on the surface, so that the rotation is desirable for forming such the layers on the substrate 1. Further, combining the revolution with the rotation is more desirable. By cooling the substrate 1 according to demand, a warp amount of the substrate 1 can be reduced.

Furthermore, a dielectric layer such as ZnS and $SiO_2$ or a resin protective layer such as ultraviolet curable resin can be provided after forming the reflection layer 8 or like in order to prevent such the reflection layer 8 or like from deformation, if necessary, as far as the effect of the present invention is not seriously damaged. Moreover, sticking two sheets of the substrate 1 together with glue can be applicable after the reflection layer 8 or like is formed or after the above-mentioned resin protective layer is formed in addition to the reflection layer 8 or like.

It is desirable for the recording layer 4 to be crystallized previously by irradiating a laser beam or a light beam of a xenon flush lamp or like before actually recording on the recording layer 4.

An optical recording medium according to embodiments 1 through 17 of the present invention will be depicted with referring to a phase change type optical disc as an example of the optical recording medium.

In the following embodiments, an optical disc is recorded by the one-beam overwriting method by using the optical disc drive tester, model DDU1000, equipped with a laser diode having 650 nm wavelength and an optical lens having a numerical aperture NA=0.60 being manufactured by Pulstec Corp. Further, a reproduction power Pr is kept constant at 0.7 mW. Furthermore, following conditions "a" and "b" are common to all the embodiments.

Condition "a"

An optical disc is recorded by a linear velocity of 3.5 m/s and evaluated by the 8–16 modulation random pattern. A clock period "T" is 38.2 ns and a bit length is 0.267 $\mu$m/bit. The optical disc is recorded as the same packing density as a DVD-ROM and its capacity is equivalent to 4.7 Gbytes. A clock to data jitter is measured by slicing a reproduced signal at a center of its amplitude. The clock to data jitter is measured by using the player LM220A manufactured by ShibaSoku at the linear velocity of 7.0 m/s. Optical constants of each layer are measured by the same wavelength as a light utilized for recording, erasing and reproducing by the standard spectroscopic ellipsometry.

Condition "b"

An optical disc is recorded by a linear velocity of 7.0 m/s and a clock period "T" is 19.1 ns. The other parameters are the same as those of the condition "a".

Embodiment 1

Each layer is formed on a polycarbonate resin made substrate 1 of 120 mm in diameter and 0.6 mm in thickness. A blank groove having a track pitch of 0.74 $\mu$m is formed on the substrate 1. A depth of the groove is 30 nm. A ratio of groove width to land width is approximately 40:60.

First of all, a first protective layer 2 having a layer thickness of 60 nm is formed on the substrate 1 by sputtering ZnS added with 20 mol % of $SiO_2$ by the high frequency magnetron sputtering method in an atmosphere of $2 \times 10^{-1}$ Pa of Ar gas after a vacuum container is degassed up to $1 \times 10^{-5}$ Pa.

Sputtering Ge target added with 20 mol % of Cr on the first protective layer 2 in an atmosphere of mixed gas of Ar and nitrogen forms an interfacial layer 3 having a layer thickness of 2 nm. A recording layer 4 is formed in a layer thickness of 18 nm on the interfacial layer 3 by sputtering a 4-element single target containing Ag, In, Sb and Te. A second protective layer 5 is formed in a layer thickness of 5 nm on the recording layer 4 by using the same material as the first protective layer 2. A light absorbing and heat generating layer 6 having a refractive index of 4.1 and an extinction coefficient of 2.4 is formed in a layer thickness of 2 nm on the second protective layer 5 by sputtering a Ge—Cr alloy target. A third protective layer 7 is formed in a layer thickness of 15 nm on the light absorbing and heat generating layer 6 by using the same material as the first protective layer 2. Finally, a reflection layer 8 is formed in a layer thickness of 170 nm by sputtering an Al—Ti target on the third protection layer 7. These layers are laminated in order.

The substrate 1 laminated by each layer is taken out form the vacuum container. By spin coating acrylic ultraviolet curable resin such as XR11 by Sumitomo Chemical Co. on the reflection layer 8 and hardening the resin by irradiating ultraviolet light, a protective film 9 having a film thickness of 10 $\mu$m is formed on the reflection layer 8, and then an optical disc covered with the protective film 9 is obtained.

A both side recordable optical disc is produced by sticking two sheets of the substrate 1 formed as mentioned above together by using an adhesive sheet. By irradiating a laser beam in wide-beam of which a beam width in a track direction or longitudinal direction is wider than a width in a radial direction on the optical disc produced as mentioned above and by heating the recording layer 4 more than a crystallizing temperature, the optical disc is initialized. Then, the optical disc is recorded in a groove section, which is a guide groove of the recording layer 4, through the substrate 1. The groove is in a convex shape with observing from an incident direction of laser beam.

With respect to a width of each pulse as a recording condition, in a case of the condition "a", respective pulses are set to such that a head pulse is 0.3 T, a multi-pulse is 0.3 T and a cooling pulse is 1.3 T. In a case of the condition "b", respective pulses are set to such that a head pulse is 0.5 T, a multi-pulse is 0.45 T and a cooling pulse is 0.6 T. Further, a recording power is set to 14.0 mW for any measurement of jitter, reflectivity and modulation factor in accordance with both the conditions "a" and "b". Furthermore, an erasing power and a reproduction power are set to 8.0 mW and 0.7 mW respectively.

A clock to data jitter, reflectivity and modulation factor of a reproduced signal are measured, wherein a modulation factor is a value of dividing an amplitude I14 of a longest mark length 14 T by an RF level I14H in a 14 T space side. An initial jitter, reflectivity and modulation factor in accordance with the condition "a" are 6.7%, 18.1% and 63.1% respectively and an optimum recording power being a bottom jitter is 14.0 mW. Further, a jitter after 1000 times overwriting is excellent as many as 8.8%. Furthermore, an initial jitter, reflectivity and modulation factor in accordance with the condition "b" are 7.3%, 18.0% and 59.0% respectively and an optimum recording power is 15.0 mW.

Embodiment 2

An optical disc as an optical recording medium according to an embodiment 2 of the present invention is identical with the optical disc according to the embodiment 1 except for a material of the recording layer 4 utilizing a Ge—Sb—Te alloy. The optical disc of the embodiment 2 is measured up for the same parameters as the optical disc of the embodiment 1, and, as shown in Tables 1 and 2, approximately equivalent characteristics to those of the embodiment 1 can be obtained with respect to either condition "a" or "b".

by sputtering a Si—Cr alloy target in 2 nm thick and has a refractive index of 3.9 and an extinctive coefficient of 3.7

Embodiment 5

An optical disc as an optical recording medium according to an embodiment 5 of the present invention is identical with the optical disc according to the embodiment 1 except for a light absorbing and heat generating layer 6, which is formed by sputtering a Si—W alloy target in 2 nm thick and has a refractive index of 4.0 and an extinctive coefficient of 3.0.

Embodiment 6

An optical disc as an optical recording medium according to an embodiment 6 of the present invention is identical with the optical disc according to the embodiment 1 except for a light absorbing and heat generating layer 6, which is formed by sputtering a Zr—Mo alloy target in 2 nm thick and has a refractive index of 3.0 and an extinctive coefficient of 3.6.

Embodiment 7

An optical disc as an optical recording medium according to an embodiment 7 of the present invention is identical with the optical disc according to the embodiment 1 except for a light absorbing and heat generating layer 6, which is formed by sputtering an Nb—Zn alloy target in 2 nm thick and has a refractive index of 2.8 and an extinctive coefficient of 3.1.

Embodiment 8

An optical disc as an optical recording medium according to an embodiment 8 of the present invention is identical with the optical disc according to the embodiment 1 except for a light absorbing and heat generating layer 6, which is formed by sputtering a Ge target in 2 nm thick and has a refractive index of 2.8 and an extinctive coefficient of 2.6.

TABLE 1

Recording characteristics at linear velocity of 3.5 m/s (condition "a") by recording layer composition

|  | Recording layer | Reflectivity [%] | Modulation factor [%] | Jitter [%] | Optimum recording power [mW] |
|---|---|---|---|---|---|
| Embodiment 1 | Ag—In—Sb—Te | 18.1 | 63.1 | 6.7 | 14.0 |
| Embodiment 2 | Ge—Sb—Te | 18.0 | 62.5 | 6.9 | 14.0 |

TABLE 2

Recording characteristics at linear velocity of 7.0 m/s (condition "b") by recording layer composition

|  | Recording layer | Reflectivity [%] | Modulation factor [%] | Jitter [%] | Optimum recording power [mW] |
|---|---|---|---|---|---|
| Embodiment 1 | Ag—In—Sb—Te | 18.0 | 59.0 | 7.3 | 15.0 |
| Embodiment 2 | Ge—Sb—Te | 17.9 | 58.0 | 7.4 | 15.0 |

Embodiment 3

An optical disc as an optical recording medium according to an embodiment 3 of the present invention is identical with the optical disc according to the embodiment 1 except for a light absorbing and heat generating layer 6, which is formed by sputtering a Ge—Ti alloy target in 2 nm thick and has a refractive index of 3.8 and an extinctive coefficient of 3.4.

Embodiment 4

An optical disc as an optical recording medium according to an embodiment 4 of the present invention is identical with the optical disc according to the embodiment 1 except for a light absorbing and heat generating layer 6, which is formed The optical discs of the embodiments 3 through 8 are measured up for the same parameters as the optical disc of the embodiment 1, and, as shown in Tables 3 and 4, approximately equivalent characteristics to those of the embodiment 1 can be obtained with respect to either condition "a" or "b".

In addition thereto, a material of the light absorbing and heat generating layer 6 is not limited to the material disclosed in each embodiment. Any other materials disclosed in the present invention exhibit the same effect as that is explained in each embodiment.

TABLE 3

Recording characteristics at linear velocity of 3.5 m/s (condition "a") by light absorbing and heat generating layer composition

| | light absorbing and heat generating layer | Refractive index | Extinctive coefficient | Reflectivity [%] | Modulation factor [%] | Jitter [%] | Optimum recording power [mW] |
|---|---|---|---|---|---|---|---|
| Emb. 1 | Ge—Cr | 4.1 | 2.4 | 18.1 | 63.1 | 6.7 | 14.0 |
| Emb. 3 | Ge—Ti | 3.8 | 3.4 | 18.3 | 62.8 | 6.7 | 14.0 |
| Emb. 4 | Si—Cr | 3.9 | 3.7 | 18.0 | 63.2 | 6.9 | 14.0 |
| Emb. 5 | Si—W | 4.0 | 3.0 | 18.1 | 62.9 | 6.8 | 14.0 |
| Emb. 6 | Zr—Mo | 3.0 | 3.6 | 17.9 | 63.5 | 6.8 | 14.0 |
| Emb. 7 | Nb—Zn | 2.8 | 3.1 | 18.0 | 63.0 | 6.7 | 14.0 |
| Emb. 8 | Ge | 3.9 | 2.6 | 18.0 | 63.2 | 6.7 | 14.0 |
| Comp. 1 | Excluded | — | — | 18.2 | 59.0 | 7.0 | 15.0 |
| Comp. 6 | Ag | 3.3 | 0.2 | 17.0 | 58.8 | 7.2 | 15.0 |

Where "Emb." and "Comp." represent "Embodiment" and "Comparative example" respectively.

TABLE 4

Recording characteristics at linear velocity of 7.0 m/s (condition "b") by light absorbing and heat generating layer composition

| | light absorbing and heat generating layer | Refractive index | Extinctive coefficient | Reflectivity [%] | Modulation factor [%] | Jitter [%] | Optimum recording power [mW] |
|---|---|---|---|---|---|---|---|
| Emb. 1 | Ge—Cr | 4.1 | 2.4 | 18.0 | 59.0 | 7.3 | 15.0 |
| Emb. 3 | Ge—Ti | 3.8 | 3.4 | 18.2 | 58.7 | 7.4 | 15.0 |
| Emb. 4 | Si—Cr | 3.9 | 3.7 | 17.9 | 59.1 | 7.5 | 15.0 |
| Emb. 5 | Si—W | 4.0 | 3.0 | 18.0 | 58.8 | 7.4 | 15.0 |
| Emb. 6 | Zr—Mo | 3.0 | 3.6 | 17.8 | 59.4 | 7.5 | 15.0 |
| Emb. 7 | Nb—Zn | 2.8 | 3.1 | 17.9 | 58.9 | 7.3 | 15.0 |
| Emb. 8 | Ge | 3.9 | 2.6 | 18.0 | 59.2 | 7.4 | 15.0 |
| Comp. 1 | Excluded | — | — | 18.2 | 54.8 | 7.4 | 16.0 |
| Comp. 6 | Ag | 3.3 | 0.2 | 17.0 | 54.4 | 7.8 | 16.0 |

Where "Emb" and "Comp" represent "Embodiment" and "Comparative example" respectively.

Embodiment 9

An optical disc as an optical recording medium of an embodiment 9 is formed with a second protective layer 5 having a thickness of 4 nm and a second interfacial layer (not shown) provided between the recording layer 4 and the second protective layer 5. The second interfacial layer is formed in 2 nm thick by sputtering a same material and by a same forming method as the interfacial layer 3 provided between the recording layer 4 and the first protective layer 2. The other layers are the same as those of the embodiment 1.

Embodiment 10

An optical disc as an optical recording medium according to an embodiment 10 of the present invention is identical with the optical disc according to the embodiment 1 except for an interfacial layer 3 provided between the recording layer 4 and the first protective layer 2, which is formed by germanium nitride (GeN) in 2 nm thick.

Embodiment 11

An optical disc as an optical recording medium of an embodiment 11 is formed with a second protective layer 5 having a thickness of 4 nm and a second interfacial layer (not shown) provided between the recording layer 4 and the second protective layer 5. The second interfacial layer and the interfacial layer 3 provided between the recording layer 4 and the first protective layer 2 is formed by GeN (germanium nitride) in 2 nm thick respectively. The other layers are the same as those of the embodiment 1.

The optical discs of the embodiments 9 through 11 are measured up for the same parameters as the optical disc of the embodiment 1, and, as shown in Tables 5 and 6, approximately equivalent characteristics to those of the embodiment 1 can be obtained with respect to either condition "a" or "b".

TABLE 5

Recording characteristics at linear velocity of 3.5 m/s (condition "a") by material of interfacial layer

| | Interfacial layer 3 | Second interfacial layer | Reflectivity [%] | Modulation factor [%] | Jitter [%] | Optimum recording power [mW] |
|---|---|---|---|---|---|---|
| Emb. 1 | GeCrN | excluded | 18.1 | 63.1 | 6.7 | 14.0 |
| Emb. 9 | GeCrN | GeCrN | 17.9 | 63.8 | 7.0 | 14.0 |
| Emb. 10 | GeN | excluded | 18.3 | 62.8 | 6.6 | 14.0 |
| Emb. 11 | GeN | GeN | 18.1 | 63.3 | 6.8 | 14.0 |

Where "Emb." represents "Embodiment".

TABLE 6

Recording characteristics at linear velocity of 7.0 m/s (condition "b") by material of interfacial layer

|  | Interfacial layer 3 | Second interfacial layer | Reflectivity [%] | Modulation factor [%] | Jitter [%] | Optimum recording power [mW] |
|---|---|---|---|---|---|---|
| Emb. 1 | GeCrN | excluded | 18.0 | 59.0 | 7.3 | 15.0 |
| Emb. 9 | GeCrN | GeCrN | 17.8 | 59.7 | 7.6 | 15.0 |
| Emb. 10 | GeN | excluded | 18.2 | 58.7 | 7.2 | 15.0 |
| Emb. 11 | GeN | GeN | 18.1 | 59.1 | 7.4 | 15.0 |

Where "Emb." represents "Embodiment".

Embodiment 12

An optical disc as an optical recording medium according to an embodiment 12 of the present invention is identical with the optical disc according to the embodiment 1 except for second and third protective layers 5 and 7, which are formed by ZnS—SiO$_2$ in 10 nm thick respectively. According to a measurement for the optical disc of the embodiment 12 being measured up for the same parameters as the optical disc of the embodiment 1, as shown in Tables 7 and 8, an initial jitter, reflectivity and modulation factor in accordance with the condition "a" are 6.9%, 18.1% and 61.5% respectively. An initial jitter, reflectivity and modulation factor in accordance with the condition "b" is 7.4%, 18.0% and 57.0% respectively. Further, an optimum recording power being a bottom jitter is higher than that of the embodiment 1 by approximately 0.5 mW.

Embodiment 13

An optical disc as an optical recording medium according to an embodiment 13 of the present invention is identical with the optical disc according to the embodiment 1 except for a second protective layer 5, which is formed by GeN in 10 nm thick. By using a measuring method, which will be mentioned next, a film thickness and a heat conductivity σ of GeN are 30 nm and 2 respectively, wherein the GeN is obtained under conditions such that a recording power, a modulation factor and a film thickness of the second protective layer 5 of which material is ZnS—SiO$_2$ are 14 mW, 60.0% and 15 nm respectively.

Measuring Method

In an optical disc as an optical recording medium comprising a substrate 1, a first protective layer 2, an interfacial layer 3, a recording layer 4, a second protective layer 5 and a reflection layer 8 laminated in order, two types of optical discs are manufactured. One optical disc is manufactured such that a material of the second protective layer 5 is ZnS—SiO$_2$ and another optical disc is GeN. Heat conductivity of the second protective layer 5 formed by ZnS—SiO$_2$ and GeN are defined as "σ1" and "σg" respectively. Further, film thickness of each second protective layer 5 formed by ZnS—SiO$_2$ and GeN are defined as "tz" and "tg" respectively, wherein an identical modulation factor is obtained from the two optical discs at the film thickness when the two optical discs are recorded with applying a same recording power. In the two optical discs, materials and film thickness of the first protective layer 2, interfacial layer 3, recording layer 4 and reflection layer 8 are identical with each other optical discs. Furthermore, a plurality of optical discs of which the second protective layer 5 is formed by GeN is manufactured, wherein the plurality of optical discs has a variety of film thickness while a film thickness of the second protective layer 5 formed by ZnS—SiO$_2$ is arbitrary. Since an ultimate temperature of the recording layer 4 is identical with each other optical discs if a modulation factor is identical, heat quantity flowing from the recording layer 4 to the reflection layer 8 through the second protective layer 5 is identical. In other words, a heat conductive distance tx/σx of the above-mentioned two optical discs is identical with each other, therefore, the tx/σx can be defined as constant. Moreover, the "tz" (arbitrary) and the "tg", which is decided as a film thickness of an optical disc obtaining the identical modulation factor with the optical disc of which second protective layer 5 is formed by ZnS—SiO$_2$ out of the plurality of optical discs, and the "σ1" (=1) are already known. Accordingly, the heat conductivity "σg" can be obtained.

Embodiment 14

An optical disc as an optical recording medium according to an embodiment 14 of the present invention is identical with the optical disc according to the embodiment 1 except for a second protective layer 5, which is formed by germanium chromium nitride (GeCrN) in 10 nm thick. A heat conductivity σ of the germanium chromium nitride of the second protective layer 5 of the embodiment 14 is calculated as the same manner as the embodiment 13. The heat conductivity σ is 2.

The optical discs of the embodiments 13 and 14 are measured up for the same parameters as the optical disc of the embodiment 1, and, as shown in Tables 7 and 8, approximately equivalent characteristics to those of the embodiment 1 can be obtained with respect to either condition "a" or "b".

TABLE 7

Recording characteristics at linear velocity of 3.5 m/s (condition "a") by heat conductivity

|  | t2/σ2 | t3/σ3 | Second protective layer | Reflectivity [%] | Modulation factor [%] | Jitter [%] | Optimum recording power [mW] |
|---|---|---|---|---|---|---|---|
| Emb. 1 | 5 | 15 | ZnS—SiO$_2$ | 18.1 | 63.1 | 6.7 | 14.0 |
| Emb. 12 | 10 | 10 | ZnS—SiO$_2$ | 18.1 | 61.5 | 6.9 | 14.5 |
| Emb. 13 | 5 | 15 | GeN | 18.0 | 62.6 | 6.8 | 14.0 |
| Emb. 14 | 5 | 15 | GeCrN | 17.8 | 63.2 | 7.1 | 14.0 |
| Emb. 15 | 10 | 15 | GeN | 17.9 | 62.5 | 7.1 | 14.5 |
| Emb. 16 | 2 | 15 | ZnS—SiO$_2$ | 17.7 | 64.2 | 7.3 | 14.0 |
| Emb. 17 | 5 | 25 | ZnS—SiO$_2$ | 17.0 | 65.5 | 7.3 | 14.0 |
| Comp. 4 | 15 | 5 | ZnS—SiO$_2$ | 18.1 | 59.5 | 7.0 | 15.0 |
| Comp. 5 | 5 | 30 | ZnS—SiO$_2$ | 13.2 | 74.3 | 9.9 | 12.0 |
| Comp. 7 | 0 | 20 | Excluded | 14.8 | 71.0 | 9.2 | 15.0 |

TABLE 7-continued

Recording characteristics at linear velocity of 3.5 m/s (condition "a") by heat conductivity

|  | t2/σ2 | t3/σ3 | Second protective layer | Reflectivity [%] | Modulation factor [%] | Jitter [%] | Optimum recording power [mW] |
|---|---|---|---|---|---|---|---|
| Comp. 8 | 10 | 40 | ZnS—SiO$_2$ | 11.8 | 76.2 | 9.5 | 10.5 |
| Comp. 9 | 20 | 0 | ZnS—SiO$_2$ | 17.7 | 58.8 | 8.3 | 15.0 |

Where "Emb" and "Comp" represent "Embodiment" and "Comparative example" respectively, and a unit of "t2/σ2" and "t3/σ3" is "×10E−9" [m].

TABLE 8

Recording characteristics at linear velocity of 7.0 m/s (condition "b") by heat conductivity

|  | t2/σ2 | t3/σ3 | Second protective layer | Reflectivity [%] | Modulation factor [%] | Jitter [%] | Optimum Recording Power [mW] |
|---|---|---|---|---|---|---|---|
| Emb. 1 | 5 | 15 | ZnS—SiO$_2$ | 18.0 | 59.0 | 7.3 | 15.0 |
| Emb. 12 | 10 | 10 | ZnS—SiO$_2$ | 18.0 | 57.5 | 7.5 | 15.5 |
| Emb. 13 | 5 | 15 | GeN | 18.0 | 58.5 | 7.5 | 15.0 |
| Emb. 14 | 5 | 15 | GeCrN | 17.8 | 59.1 | 7.7 | 15.0 |
| Emb. 15 | 10 | 15 | GeN | 17.8 | 58.4 | 7.7 | 15.5 |
| Emb. 16 | 2 | 15 | ZnS—SiO$_2$ | 17.6 | 59.5 | 7.8 | 14.0 |
| Emb. 17 | 5 | 25 | ZnS—SiO$_2$ | 16.8 | 61.4 | 8.1 | 15.0 |
| Comp. 4 | 15 | 5 | ZnS—SiO$_2$ | 18.1 | 55.0 | 7.5 | 16.0 |
| Comp. 5 | 5 | 30 | ZnS—SiO$_2$ | 13.1 | 68.8 | 10.8 | 13.0 |
| Comp. 7 | 0 | 20 | Excluded | 14.9 | 65.6 | 10.0 | 15.0 |
| Comp. 8 | 10 | 40 | ZnS—SiO$_2$ | 11.7 | 70.1 | 14.2 | 11.5 |
| Comp. 9 | 20 | 0 | ZnS—SiO$_2$ | 17.7 | 54.5 | 9.1 | 16.0 |

Where "Emb" and "Comp" represent "Embodiment" and "Comparative example" respectively, and a unit of "t2/σ2" and "t3/σ3" is "×10E−9" [m].

Embodiment 15

An optical disc as an optical recording medium according to an embodiment 15 of the present invention is identical with the optical disc according to the embodiment 1 except for a second protective layer 5, which is formed by GeN having a heat conductivity σ=2 in 20 nm thick. According to a measurement for the optical disc of the embodiment 15 being measured up for the same parameters as the optical disc of the embodiment 1, as shown in Tables 7 and 8, an initial jitter, reflectivity and modulation factor according to the condition "a" are 7.1%, 17.9% and 62.5% respectively. An initial jitter, reflectivity and modulation factor according to the condition "b" is 7.5%, 17.8% and 57.0% respectively. Further, an optimum recording power being a bottom jitter is higher than that of the embodiment 1 by approximately 0.5 mW.

Embodiment 16

An optical disc as an optical recording medium according to an embodiment 16 of the present invention is identical with the optical disc according to the embodiment 1 except for a second protective layer 5, which is formed by germanium chromium nitride (GeCrN) in 4 nm thick. A heat conductivity σ of the germanium chromium nitride of the second protective layer 5 of the embodiment 16 is calculated as the same manner as the embodiment 13. The heat conductivity σ is 2 as a result of calculation.

Embodiment 17

An optical disc as an optical recording medium according to an embodiment 17 of the present invention is identical with the optical disc according to the embodiment 1 except for a second protective layer 5, which is formed by germanium chromium nitride (GeCrN) in 10 nm thick, and a third protective layer 7 of which thickness is 25 nm. A heat conductivity σ of GeCrN in the second protective layer 5 of the embodiment 17 is calculated as the same manner as the embodiment 13. The heat conductivity σ is 2 as a result of calculation.

The optical discs of the embodiments 16 and 17 are measured up for the same parameters as the optical disc of the embodiment 1, and, as shown in Tables 7 and 8, approximately equivalent characteristics to those of the embodiment 1 can be obtained with respect to either condition "a" or "b".

Further, a material of the second protective layer 5 and the third protective layer 7 is not limited to the material disclosed in each embodiment. Any materials can be utilized for the second or third protective layer as far as the material satisfies the relation of the heat conductive distances disclosed in the present invention. Furthermore, any materials commonly available in the market can be utilized for materials for the substrate, the recording layer, the interfacial layer, the reflection layer and the protective film of the present invention. These materials are not limited to those disclosed in the preferred embodiments.

Comparative Example 1

An optical disc as an optical recording medium according to a comparative example 1 is identical with the optical disc according to the embodiment 1 except for a light absorbing and heat generating layer 6 being deleted. According to a measurement for the optical disc of the comparative example 1 being measured up for the same parameters as the optical disc of the embodiment 1, as shown in Tables 3 and 4, an initial jitter and reflectivity in the condition "a" are 7.0%, 18.2% respectively. The values of the jitter and reflectivity are approximately the same as those of the embodiment 1. However, a modulation factor is 59.0% and it is inferior to that of the embodiment 1. Further, an optimum recording power being a bottom jitter is 15.0 mW being higher than that of the embodiment 1 by 1.0 mW. It exhibits that a recording sensitivity is low. Furthermore, measurement in accordance with the condition "b" is a similar situation to the condition "a". An initial jitter and reflectivity are approximately the same as those of the embodiment 1. However, a modulation factor is 55.0% and it is inferior to that of the embodiment 1. In addition thereto, an optimum recording power being a bottom jitter is higher than that of the embodiment 1 by 1.0 mW.

Comparative Example 2

An optical disc as an optical recording medium according to a comparative example 2 is identical with the optical disc according to the embodiment 1 except for a light absorbing and heat generating layer having a thickness of 2 nm, which is inserted between the third protective layer 7 and the reflection layer 8. According to a measurement for the optical disc of the comparative example 2 being measured up for the same parameters as the optical disc of the embodiment 1, as shown in Tables 9 and 10, both a reflectivity and a modulation factor are approximately the same characteristic as the comparative example 1. However, a jitter characteristic is inferior to that of the comparative example 1.

Further, an optimum recording power being a bottom jitter is 15.0 mW as same level as the comparative example 1. However, it is higher than that of the embodiment 1 by 1.0 mW. This exhibits that heat generated in the light absorbing and heat generating layer 6 is transmitted to the reflection layer 8 having a higher heat conductivity even though a light absorbing function is acting.

Comparative Example 3

An optical disc as an optical recording medium according to a comparative example 3 is identical with the optical disc according to the embodiment 1 except for a light absorbing and heat generating layer having a thickness of 2 nm, which is inserted between the recording layer 4 and the second protective layer 5. According to a measurement for the optical disc of the comparative example 3 being measured up for the same parameters as the optical disc of the embodiment 1, as shown in Table 9, a modulation factor in accordance with the condition "a" is high as many as 71.0%. However, other electric characteristics are seriously deteriorated such that a reflectivity is 14.8% and an initial jitter is 9.2%. Further, an optimum recording power being a bottom jitter is 15.0 mW as same level as the comparative example 1. However, it is higher than that of the embodiment 1 by 1.0 mW. Furthermore, an optimum recording strategy is shifted to a direction of reducing a crystallizing sensitivity. This exhibits that the light absorbing and heat generating layer 6 melts in the recording layer 4 and the recording layer 4 becomes another recording layer composition being defective in a recording characteristic.

TABLE 9

Recording characteristics at linear velocity of 3.5 m/s (condition "a") by location of light absorbing and heat generating layer

|  | Location of light absorbing and heat generating layer | Reflectivity [%] | Modulation factor [%] | Jitter [%] | Optimum recording power [mW] |
|---|---|---|---|---|---|
| Emb. 1 | Between 2nd and 3rd protective layers | 18.1 | 63.1 | 6.7 | 14.0 |
| Comp. 2 | Between 3rd protective layer and reflection layer | 17.7 | 58.8 | 8.3 | 15.0 |
| Comp. 3 | Between recording layer and 2nd protective layer | 14.8 | 71.0 | 9.2 | 15.0 |

Where "Emb." and "Comp." represent "Embodiment" and "Comparative example" respectively.

TABLE 10

Recording characteristics at linear velocity of 7.0 m/s (condition "b") by location of light absorbing and heat generating layer

|  | Location of light absorbing and heat generating layer | Reflectivity [%] | Modulation factor [%] | Jitter [%] | Optimum recording power [mW] |
|---|---|---|---|---|---|
| Emb. 1 | Between 2nd and 3rd protective layers | 18.0 | 59.0 | 7.3 | 15.0 |
| Comp. 2 | Between 3rd protective layer and reflection layer | 17.7 | 54.5 | 9.1 | 16.0 |
| Comp. 3 | Between recording layer and 2nd protective layer | 14.9 | 65.6 | 10.0 | 16.0 |

Where "Emb." and "Comp." represent "Embodiment" and "Comparative example" respectively.

Comparative Example 4

An optical disc as an optical recording medium according to a comparative example 4 is identical with the optical disc according to the embodiment 1 except for the second and third protective layers 5 and 7 of which thickness is 15 nm and 5 nm respectively. According to a measurement for the optical disc of the comparative example 4 being measured up for the same parameters as the optical disc of the embodiment 1, as shown in Tables 7 and 8, approximately equivalent characteristics to the comparative example 1 can be obtained with respect to either condition "a" or "b". Further, an optimum recording power is also similar to that of the comparative example 1. Consequently, an effect of the light absorbing and heat generating layer 6 is not remarkable.

Comparative Example 5

An optical disc as an optical recording medium according to a comparative example 5 is identical with the optical disc according to the embodiment 1 except for a third protective layer 7 of which thickness is 30 nm. According to a measurement for the optical disc of the comparative example 5 being measured up for the same parameters as the optical disc of the embodiment 1, as shown in Tables 7 and 8, a modulation factor increases with respect to either the condition "a" or the condition "b". On the contrary, a reflectivity decreases. Further, an optimum recording power decreases and a jitter is deteriorated.

Comparative Example 6

An optical disc as an optical recording medium according to a comparative example 6 is identical with the optical disc according to the embodiment 1 except for a light absorbing and heat generating layer 6. The light absorbing and heat generating layer 6 is replaced by a layer, which is formed by sputtering an Ag target in 2 nm thick and has a refractive index of 3.3 and an extinctive coefficient of 0.2.

Comparative Example 7

An optical disc as an optical recording medium according to a comparative example 7 is identical with the optical disc according to the embodiment 1 except for a second protective layer 5, which is not provided, and a third protective layer 7 of which thickness is 20 nm. According to a measurement for the optical disc of the comparative example 7 being measured up for the same parameters as the optical disc of the embodiment 1, as shown in Table 7, electric characteristics in accordance with the condition "a" are remarkably deteriorated such that reflectivity and an initial jitter are 14.8% and 9.2% respectively although a modulation factor is relatively high as many as 71.0%. Further, a recording power being a bottom jitter is 15.0 mW as same level as the comparative example 1. However, it is higher than that of the embodiment 1 by 1.0 mW. Furthermore, an optimum recording strategy is shifted to a direction of reducing a crystallizing sensitivity. This exhibits that the light absorbing and heat generating layer 6 melts in the recording layer 4 and the recording layer 4 becomes another recording layer composition being defective in a recording characteristic.

Comparative Example 8

An optical disc as an optical recording medium according to a comparative example 8 is identical with the optical disc according to the embodiment 1 except for a second protective layer 5 of which thickness is 10 nm and a third protective layer 7 of which thickness is 40 nm. According to a measurement for the optical disc of the comparative example 7 being measured up for the same parameters as the optical disc of the embodiment 1, as shown in Tables 7 and 9, a modulation factor increases with respect to either the condition "a" or "b". However, reflectivity decreases. Further, an optimum recording power decreases. Furthermore, a jitter value is deteriorated.

Comparative Example 9

An optical disc as an optical recording medium according to a comparative example 9 is identical with the optical disc according to the embodiment 1 except for a second protective layer 5 of which thickness is 10 nm and a third protective layer 7, which is not provided. According to a measurement for the optical disc of the comparative example 9 being measured up for the same parameters as the optical disc of the embodiment 1, as shown in Tables 7 and 8, reflectivity and a modulation factor in accordance with either the condition "a" or "b" are approximately the same characteristics as those of the comparative example 1. However, a jitter value is deteriorated. Further, a recording power being a bottom jitter is 15.0 mW as same level as the comparative example 1. However, it is higher than that of the embodiment 1 by 1.0 mW. This exhibits that heat generated in the light absorbing and heat generating layer 6 is transmitted to the reflection layer 8 having a higher heat conductivity even though a light absorbing function is acting.

According to the aspect of the present invention, there provided an optical recording medium, which can increase a recording sensitivity in a recording layer, can obtain a higher optical modulation factor even by irradiating a laser beam in a lower power and can maintain a higher recording characteristic even by recording in a higher linear velocity without deteriorating characteristics such as reflectivity and jitter, because a reflectivity of the optical recording medium and an optical modulation factor of a reflection layer, which is an optical modulation factor in a phase change state of crystalline or amorphous, can always be maintained in high by using a light absorbing and heat generating layer constituted as mentioned above or the protective layer mentioned above.

What is claimed is:

1. An optical recording medium comprising:

a substrate, a first protective layer, a recording layer, a second protective layer, a light absorbing and heat generating layer, a third protective layer and a reflection layer laminated in order;

a second heat conductive distance d2 between the light absorbing and heat generating layer and the recording layer, wherein heat is transmitted from the light absorbing and heat generating layer to the recording layer through the second protective layer, and a third heat conductive distance d3 between the light absorbing and heat generating layer and the reflection layer, wherein heat is transmitted from the light absorbing and heat generating layer to the reflection layer through the third protective layer, wherein $d2 \leq d3 < 30 \times 10^{-9}$ (m); $d2=(t2/\sigma2)$ (m) and $d3=(t3/\sigma3)$ (m) respectively, where t2 is a thickness of the second protective layer, t3 is a thickness of the third protective layer, σ2 is a heat conductivity of the second protective layer, σ3 is a heat conductivity of the third protective layer, and wherein σ2 and σ3 are expressed in a value relative to a heat conductivity σ1 of $ZnS_{(80)}-SiO_{2(20)}$ being 1.0.

* * * * *